Jan. 4, 1966   G. GARCEA ETAL   3,227,466
ARRANGEMENT FOR REGULATING THE TRIM OF SUSPENDED AUTOMOBILES
AND THE LIKE VEHICLES AT A CONSTANT LEVEL
Filed Feb. 3, 1964
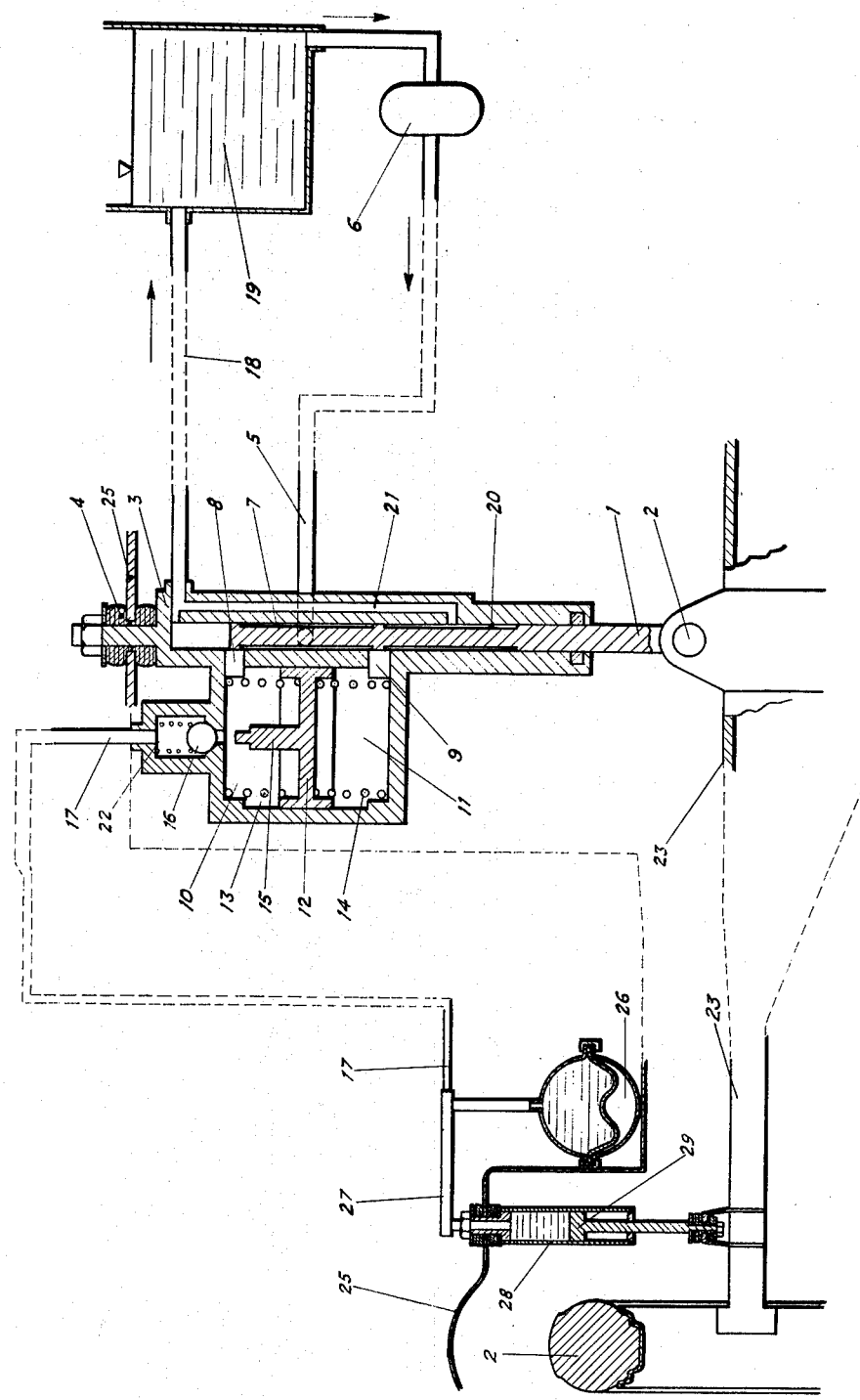

United States Patent Office 3,227,466
Patented Jan. 4, 1966

3,227,466
ARRANGEMENT FOR REGULATING THE TRIM OF SUSPENDED AUTOMOBILES AND THE LIKE VEHICLES AT A CONSTANT LEVEL
Giampaolo Garcea, Filippo Surace, and Renzo Ferrante, Milan, Italy, assignors to Alfa Romeo S.p.A., Milan, Italy, a company of Italy
Filed Feb. 3, 1964, Ser. No. 341,965
Claims priority, application Italy, Mar. 14, 1963, Patent 689,599
1 Claim. (Cl. 280—6)

It is a known fact that in vehicles provided with pneumatic or oleopneumatic suspensions the static level of the vehicle, that is the distance above ground of the body of the vehicle under static conditions, is maintained constant in spite of the modifications in the load applied to the actual vehicle, this being obtained through a corresponding modification in the amount of fluid contained in the elastic suspension system. The introduction of the fluid into the elastic suspension system, or the output of fluid out of the latter, are controlled by a regulating system which is mechanically connected either with the wheel or with the parts of the suspension rigid with the latter, or else with the body of the vehicle and is consequently sensitive to the modifications in the distance between the two sections of the vehicle and therefore to the level of the vehicle. It is however a known fact that one of the chief features of said regulating means consists in preventing the introduction of the fluid into the elastic suspension system and the exhaust of the fluid out of the latter from occurring continuously during the running of the vehicle over an uneven ground whenever the latter moves for a very short duration over hindrances, so that the dynamic trim of the vehicle varies continuously above and below a medial value coinciding with that obtained for static conditions.

The admission and exhaust of the fluid referred to hereinabove should obviously be provided in contradistinction only when the static load applied to the vehicle is modified, that is when the trim varies to either side of the trim corresponding to a static trim, and fluctuates. This essential feature of regulating means is generally obtained in a manner such that one of the two connections of the actual arrangement with reference to the body of the vehicle and with the section of the suspension which is rigid with the wheel is not constituted by rigid kinematic members, but by an elastic member inserted in series with a damping or delaying member.

An adjusting arrangement of such a type shows however difficulties in its execution and operative drawbacks, whereas a good accuracy is required as concerns the level obtained, together with a reduced sensitivity to the modifications in viscosity of the damping liquid, simplicity, low cost price and the like.

The present application has for its object regulating means in which the inner member which is subjected to the modifications in the trim of the vehicle, whether static or dynamic, is controlled rigidly so as to move freely even under the action of dynamic modifications in the trim, this being allowed by the fact that said member does not control directly the valves or ports provided for the distribution of the fluid into the elastic suspension means or for exhausting the fluid out of the latter, as in the conventional arrangement, but it provides primarily the opening of passages for the fluid between the volumetric pump or the volumetric compressor provided as in the case of conventional arrangements and small capacities which may vary under the action of a piston or a movable wall. When said ports are open, the piston or the movable wall is shifted more or less slowly, taking into account its size and the cylinder volume of the pump or compressor, while a certain time is required before it reaches the end of its stroke. It is only when it reaches said end and consequently after a short delay that the valves or ports are opened for the introduction of the fluid into the elastic suspension means or for the exhaust of the fluid out of the latter. By reason of the yielding action of the springs returning the piston or the diaphragm into its starting position, the pressure obtained through the shifting of the piston or of the diaphragm causes the end of its stroke to be obtained by imparting a small predominance on the delivery stroke of the pump or of the compressor. Furthermore, the metal element which is subjected to the modifications in the trim of the vehicle tapps off in its medial position in a continuous manner the output of the pump which thus cannot deliver during the small dynamic oscillations. The absorption of power for continuous adjustment is thus practically reduced to zero and the pressure increases and therewith the absorption of power only when there are positive modifications in the load applied statically to the vehicle. The absence of elastic members and damping means between the suspension system and the regulating means provides thus a substantially accurate arrangement in a very simple and economical manner which allows thus obtaining a constant level.

In contradistinction, furthermore, with the conventional arrangement, the regulating system according to the present invention cuts out completely any risk of pendular movement upon any instigation to modify the trim. It has already been mentioned hereinabove that it is advantageous to resort to the arrangement according to the invention which cuts out the problem arising from any modifications in viscosity of the damping liquid as in the case in conventional systems. A further advantage, chiefly as concerns the light weight and reduced cost price, consists in that the fluid reservoir need not be subjected to pressure as is generally required with conventional systems.

By way of exemplification, and by no means in a limiting sense, there is illustrated in the accompanying single figure of the drawing a cross-section of the regulating system associated with a suspension.

The cylindrical distributing casting 1 is connected with the movement of the wheels through an opening formed in a projection on the axle 23 of the wheel 24 while the body of the arrangement 3 is secured to the body of the vehicle 25 through an elastic member 4. The pipe 5 connects the volumetric pump 6 with an annular chamber 7 and the cylindrical casing 1 controls, throughout movements, the opening and the closing of the two ports 8 and 9 connecting said annular chamber 7 respectively with the associated capacities 10 and 11. The piston 12 is adapted to move in both directions inside said variable capacities 10 and 11 and it is held in a medial position by the two steel springs 13 and 14. When the load of the vehicle is reduced, the cylindrical casing 1 is shifted downwardly and sets the volumetric pump 6 in communication through the pipe 5, the annular chamber 7 and the port 9 with the lower variable capacity 11. The piston 12 is thus shifted upwardly and when it reaches the end of its upward movement, it opens mechanically through the stud 15 carried thereby the valve 16. Said valve 16 is connected through the pipe 17 with the suspension constituted by the pneumatic elastic cushion 26 connected in its turn through the pipe 27 with the cylinder 28 rigid with the vehicle body 25, said cylinder carrying a piston 29 rigid with the axle 23 of the wheel. This allows consequently the exhaust of the hydraulic fluid out of said suspension means through the pipe 17, the valve 16, the capacity 10, the port 8 and the pipe 18 which leads to the container of hydraulic fluid 19. During the upward movement of the piston 12, the hydraulic fluid contained in the variable capacity 10 is urged into the container 19 through the said port 8 and the pipe 18. When, in contradistinction, the load on the vehicle is increased, the cylindrical casing 1 is shifted upwardly and connects the volumetric pump 6 through the pipe 5, the annular chamber 7 and the port 8 with the variable capacity 10, so that the piston 12 moves downwardly, without as yet opening the valve 16, since the pressure entering the capacity 10 by reason of the reaction of the springs 13 and 14, is not sufficient for overcoming the pressure prevailing in the pipe 17 which is added to the pressure provided by the spring 22, so as to prevent the opening of the valve 16. However, when the piston 12 reaches the end of its downward stroke, the valve 16 opens under the action of the pressure provided by the pump, which allows introduction of the hydraulic fluid into the suspension means under the action of the volumetric pump through the pipe 5, the annular chamber 7, the port 8, the capacity 10, the valve 16 and the pipe 17. During the movement of the piston 12 in a downward direction, the hydraulic fluid contained in the variable capacity 11 escapes into the container 19 through the port 9, the annular chamber 20 and the pipes 21 and 18.

The valve 16 closes furthermore in a perfect manner the suspension means in the case of the vehicle being at a standstill or in the absence of any modification in load.

For small movements of the cylindrical distributing casing 1, produced by unevenesses of the ground, the volumetric pump 6 is connected directly through the uncovering of the port 8 and 9 and the pipe 18 with the container 19. In said case, consequently, it does not deliver in any manner and does not absorb any power. For larger movements, consequent always on unevenesses of the ground, the circuit of the pump 6 reaches alternately the variable capacities 10 and 11. In this case also, its delivery is negligible, since the two springs 13 and 14 produce very small resistances.

We claim:

In a vehicle provided with a suspension fitted between suspended and unsuspended sections of the vehicle, and including a fluid-operated member, the provision of a regulating system adapted to maintain constancy of the level of the suspended section of the vehicle and comprising a pump having an inlet and an outlet, said pump delivering the fluid for operating said member, a container for said fluid, a closed circuit connecting the outlet of the pump with the container and the container with the inlet of the pump, two branch conduits adapted to be connected with said closed circuit, two interengaging parts operably connected with the corresponding sections of the vehicle respectively and controlling the connection of the closed circuit with said branch conduits selectively according to the direction of shifting of said parts with reference to each other, a casing, a member shiftable in said casing and subdividing the same into two capacities connected each with one of the branch conduits, said shiftable member being urged by the fluid passing out of the branch circuits selectively into corresponding extreme positions, springs floatingly holding said shiftable member inside the casing, a pipe connecting one capacity with the fluid-operated member, a spring-urged valve closing said pipe and adapted to enter an inoperative position both under a pressure greater than that required for shifting the shiftable member towards one extreme position and under the thrust of said shiftable member when entering its other extreme position, the fluid entering one capacity through the corresponding branch circuit urging the shiftable member towards said one extreme position to allow the pump to feed fluid into the fluid-operated member through last-mentioned capacity and the fluid entering the other capacity through the other branch circuit urging the shiftable member into said other extreme position to make the valve enter its inoperative position and allow the fluid to be aspirated from the fluid-operated piston and back into the container through said other capacity.

References Cited by the Examiner

UNITED STATES PATENTS 1,990,517 2/1935 Bedford.
2,937,034 5/1960 Langen.

BENJAMIN HERSH, *Primary Examiner.*

LEO FRIAGLIA, A. HARRY LEVY, *Examiners.*